(12) United States Patent
Cachet et al.

(10) Patent No.: US 12,370,678 B2
(45) Date of Patent: Jul. 29, 2025

(54) DEMONSTRATION-CONDITIONED REINFORCEMENT LEARNING FOR FEW-SHOT IMITATION

(71) Applicant: NAVER CORPORATION, Gyeonggi-do (JP)

(72) Inventors: Theo Cachet, Grenoble (FR); Christopher Dance, Grenoble (FR); Julien Perez, Grenoble (FR)

(73) Assignee: NAVER CORPORATION, Gyeonggi-Do (KR)

( * ) Notice: Subject to any disclaimer, the term of this patent is extended or adjusted under 35 U.S.C. 154(b) by 504 days.

(21) Appl. No.: 17/716,520

(22) Filed: Apr. 8, 2022

(65) Prior Publication Data
US 2022/0395975 A1    Dec. 15, 2022

(30) Foreign Application Priority Data
Jun. 10, 2021    (EP) .................................... 21305799

(51) Int. Cl.
| | |
|---|---|
| B25J 9/16 | (2006.01) |
| G05B 13/02 | (2006.01) |
| G05D 1/00 | (2006.01) |
| G05D 13/02 | (2006.01) |

(52) U.S. Cl.
CPC .......... B25J 9/163 (2013.01); G05B 13/0265 (2013.01); G05D 1/0088 (2013.01)

(58) Field of Classification Search
CPC .............................. B25J 9/163; G05B 13/0265
USPC .......................................................... 700/246
See application file for complete search history.

(56) References Cited

U.S. PATENT DOCUMENTS

| | | | |
|---|---|---|---|
| 10,452,978 B2 | 10/2019 | Shazeer et al. | |
| 2019/0102676 A1* | 4/2019 | Nazari | G06N 3/08 |
| 2021/0205988 A1* | 7/2021 | James | B25J 9/1661 |
| 2021/0308863 A1* | 10/2021 | Liu | B25J 9/163 |
| 2022/0105624 A1* | 4/2022 | Kalakrishnan | B25J 9/163 |

(Continued)

OTHER PUBLICATIONS

Abbeel, P. and Ng, A. Y. Apprenticeship learning via inverse reinforcement learning. In Proceedings of the 21st International Conference on Machine Learning (ICML), pp. 1. Association for Computing Machinery, 2004.

(Continued)

*Primary Examiner* — Kira Nguyen

(57) ABSTRACT

A computer-implemented method for performing few-shot imitation is disclosed. The method comprises obtaining at least one set of training data, wherein each set of training data is associated with a task and comprises (i) one of samples of rewards and a reward function, (ii) one of samples of state transitions and a transition distribution, and (iii) a set of first demonstrations, training a policy network embodied in an agent using reinforcement learning by inputting at least one set of first demonstrations of the at least one set of training data into the policy network, and by maximizing a risk measure or an average return over the at least one set of first demonstrations of the at least one set of training data based on respective one or more reward functions or respective samples of rewards, obtaining a set of second demonstrations associated with a new task, and inputting the set of second demonstrations and an observation of a state into the trained policy network for performing the new task.

30 Claims, 6 Drawing Sheets

(56) References Cited

U.S. PATENT DOCUMENTS

| | | | |
|---|---|---|---|
| 2022/0297303 A1* | 9/2022 | Khansari Zadeh | B25J 9/1697 |
| 2023/0256593 A1* | 8/2023 | Zolna | B25J 9/163 |
| | | | 706/21 |

OTHER PUBLICATIONS

Allan Zhou, Eric Jang, Daniel Kappler, Alexander Herzog, Mohi Khansari, Paul Wohlhart, Yunfei Bai, Mrinal Kalakrishnan, Sergey Levine, and Chelsea Finn. Watch, try, learn: Meta-learning from demonstrations and rewards. In International Conference on Learning Representations, ICLR, 2020.

Amodei, D., Olah, C., Steinhardt, J., Christiano, P., Schulman, J., and Man'e, D. Concrete problems in AI safety. arXiv preprint arXiv:1606.06565, 2016.

Anirban Santara, Abhishek Naik, Balaraman Ravindran, Dipankar Das, Dhee-vatsa Mudigere, Sasikanth Avancha, and Bharat Kaul. RAIL: Risk-averse imitation learning. arXiv preprint arXiv:1707.06658, 2017.

Anirudha Majumdar and Marco Pavone. How should a robot assess risk? towards an axiomatic theory of risk in robotics. In Robotics Research, pp. 75{84. Springer, 2020.

Arora, S., Du, S. S., Kakade, S., Luo, Y., and Saunshi, N. Provable representation learning for imitation learning via bi-level optimization. In International Conference on Machine Learning, ICML, arXiv preprint arXiv:2002.10544, 2020.

Ashvin Nair, Vitchyr Pong, Murtaza Dalal, Shikhar Bahl, Steven Lin, and Sergey Levine. Visual reinforcement learning with imagined goals. In Advances in Neural Information Processing Systems, NeurIPS, pp. 9209-9220, 2018.

Avi Singh, Eric Jang, Alexander Irpan, Daniel Kappler, Murtaza Dalal, Sergey Levine, Mohi Khansari, and Chelsea Finn. Scalable multi-task imitation learning with autonomous improvement. In IEEE International Conference on Robotics and Automation, ICRA, pp. 2167-2173, 2020.

Alessandro Bonardi, Stephen James, and Andrew J. Davison. Learning one-shot imitation from humans without humans. IEEE Robotics and Automation. Letters, 5(2):3533-3539, 2020.

Boyd, R., Richerson, P. J., and Henrich, J. The cultural niche: Why social learning is essential for human adaptation. Proceedings of the National Academy of Sciences, 108:10918-10925, 2011.

Brown, D. S., Goo, W., Nagarajan, P., and Niekum, S. Extrapolating beyond suboptimal demonstrations via inverse reinforcement learning from observations. arXiv preprint arXiv:1904.06387, 2019.

Brown, T. B., Mann, B., Ryder, N., Subbiah, M., Kaplan, J., Dhariwal, P., Neelakantan, A., Shyam, P., Sastry, G., Askell, A., Agarwal, S., Herbert-Voss, A., Krueger, G., Henighan, T., Child, R., Ramesh, A., Ziegler, D. M., Wu, J., Winter, C., Hesse, C., Chen, M., Sigler, E., Litwin, M., Gray, S., Chess, B., Clark, J., Berner, C., McCandlish, S., Radford, A., Sutskever, I., and Amodei, D. Language models are few-shot learners. arXiv preprint arXiv:2005.14165, 2020.

Cachet Théo et al: "Transformer-based Meta-Imitation Learning for Robotic Manipulation", 3rd Workshop on Robot Learning, Thirty-fourth Conference on Neural Information Processing Systems (NeurIPS), virtual only conference, Dec. 6-12, 2020, Dec. 6, 2020 (Dec. 6, 2020), XP055871807.

Carion, N., Massa, F., Synnaeve, G., Usunier, N., Kirillov, A., and Zagoruyko, S. End-to-end object detection with transformers. In European Conference on Computer Vision, ECCV, vol. 12346 of Lecture Notes in Computer Science, pp. 213-229, 2020.

Charpentier, C. J., Iigaya, K., and O'Doherty, J. P. A neurocomputational account of arbitration between choice imitation and goal emulation during human observational learning. Neuron, 106(4):687-699, 2020.

Cheng, Z., Liu, L., Liu, A., Sun, H., Fang, M., and Tao, D. On the guaranteed almost equivalence between imitation learning from observation and demonstration. arXiv preprint arXiv:2010.08353, 2020.

Dalal, G., Dvijotham, K., Vecerik, M., Hester, T., Paduraru, C., and Tassa, Y. Safe exploration in continuous action spaces. arXiv, abs/1801.08757, 2018.

Daniel S. Brown, Wonjoon Goo, and Scott Niekum. Better-than-demonstrator imitation learning via automatically-ranked demonstrations. In Conference on Robot Learning, CoRL, vol. 100 of Proceedings of Machine Learning Research, pp. 330-359, 2019.

Dasari, S. and Gupta, A. Transformers for one-shot visual imitation. In Conference on Robot Learning, CoRL, 2020.

De-An Huang, Suraj Nair, Danfei Xu, Yuke Zhu, Animesh Garg, Li Fei-Fei, Silvio Savarese, and Juan Carlos Niebles. Neural task graphs: Generalizing to unseen tasks from a single video demonstration. In IEEE Conference on Computer Vision and Pattern Recognition, CVPR, pp. 8565-8574, 2019.

Diana Borsa, Bilal Piot, Remi Munos, and Olivier Pietquin. Observational learning by reinforcement learning. arXiv preprint arXiv:1706.06617, 2017.

Dibya Ghosh, Abhishek Gupta, and Sergey Levine. Learning actionable representations with goal conditioned policies. In International Conference on Learning Representations, ICLR, 2019.

Ding, Y., Florensa, C., Abbeel, P., and Phielipp, M. Goal conditioned imitation learning. In Advances in Neural Information Processing Systems, NeurIPS, pp. 15298-15309, 2019.

Dmytro Korenkevych, A. Rupam Mahmood, Gautham Vasan, and James Bergstra. Autoregressive policies for continuous control deep reinforcement learning. In International Joint Conference on Articial Intelligence, IJCAI, pp. 2754-2762, 2019.

Duan, Y., Andrychowicz, M., Stadie, B., Ho, J., Schneider, J., Sutskever, I., Abbeel, P., and Zaremba, W. One-shot imitation learning. In Advances in Neural Information Processing Systems, NIPS, pp. 1087-1098, 2017.

Dulac-Arnold, G., Mankowitz, D., and Hester, T. Challenges of real-world reinforcement learning. arXiv preprint arXiv:1904.12901, 2019.

Finn, C., Abbeel, P., and Levine, S. Model-agnostic metalearning for fast adaptation of deep networks. In International Conference on Machine Learning, pp. 1126-1135. PMLR, 2017.

Finn, C., Levine, S., and Abbeel, P. Guided cost learning: Deep inverse optimal control via policy optimization. In International Conference on Machine Learning (ICML), pp. 49-58, 2016.

Finn, C., Yu, T., Zhang, T., Abbeel, P., and Levine, S.: One-shot visual imitation learning via meta-learning, arXiv preprint arXiv:1709.04905, 2017.

Garcia, J. and Fernandez, F. Safe exploration of state and action spaces in reinforcement learning. Journal of Artificial Intelligence Research, 45:515-564, 2012.

Ghosh, D., Gupta, A., and Levine, S. Learning actionable representations with goal conditioned policies. In International Conference on Learning Representations, ICLR, 2019.

Glorot, X. and Bengio, Y. Understanding the difficulty of training deep feedforward neural networks. In International Conference on Artificial Intelligence and Statistics, AISTATS, 2010.

Goo, W. and Niekum, S. One-shot learning of multi-step tasks from observation via activity localization in auxiliary video. In International Conference on Robotics and Automation, ICRA, pp. 7755-7761, 2019.

Gu, Albert, Goael, Karan, Ré, Christopher. "Efficiently Modeling Long Sequences with Structured State Spaces" Conference paper at ICLR 2022. openreview.net/forum?id=uYLFoz1vIAC.

Guo, X., Chang, S., Yu, M., Tesauro, G., and Campbell, M. Hybrid reinforcement learning with expert state sequences. In AAAI Conference on Artificial Intelligence, AAAI, pp. 3739-3746, 2019.

He, K., Zhang, X., Ren, S., and Sun, J. Delving deep into rectifiers: Surpassing human-level performance on ImageNet classification. In IEEE Conference on Computer Vision and Pattern Recognition, CVPR, pp. 1026-1034, 2015.

Hester, T., Vecerik, M., Pietquin, O., Lanctot, M., Schaul, T., Piot, B., Horgan, D., Quan, J., Sendonaris, A., Osband, I., Dulac-Arnold, G., Agapiou, J. P., Leibo, J. Z., and Gruslys, A. Deep Q-learning from demonstrations. In AAAI Conference on Artificial Intelligence, vol. 32, 2018.

(56) References Cited

OTHER PUBLICATIONS

Ho, J. and Ermon, S. Generative adversarial imitation learning. In Advances in Neural Information Processing Systems, NIPS, pp. 4565-4573, 2016.

Ho, J., Kalchbrenner, N., Weissenborn, D., and Salimans, T. Axial attention in multidimensional transformers. arXiv preprint arXiv:1912. 12180, Dec. 20, 2019.

Hoehl, S., Keupp, S., Schleihauf, H., McGuigan, N., Buttelmann, D., and Whiten, A. 'Over-imitation': A review and appraisal of a decade of research. Developmental Review, 51:90-108, 2019.

Huang, D., Nair, S., Xu, D., Zhu, Y., Garg, A., Fei-Fei, L., Savarese, S., and Niebles, J. C. Neural task graphs: Generalizing to unseen tasks from a single video demonstration. In IEEE Conference on Computer Vision and Pattern Recognition, CVPR, pp. 8565-8574, 2019.

James, S., Bloesch, M., and Davison, A. J. Task-embedded control networks for few-shot imitation learning. In Conference on Robot Learning, CoRL, pp. 783-795, 2018.

Jinyoung Choi, Christopher Dance, Jung-eun Kim, Seulbin Hwang, and Kyung-sik Park. Risk-conditioned distributional soft actor-critic for risk-sensitive navigation. In Submitted to International Conference on Robotics and Automation, ICRA, 2021.

Jonathan Lacotte, Mohammad Ghavamzadeh, Yinlam Chow, and Marco Pavone. Risk-sensitive generative adversarial imitation learning. In International Conference on Artificial Intelligence and Statistics, AISTATS, pp. 2154-2163, 2019.

Karl Cobbe, Chris Hesse, Jacob Hilton, and John Schulman. Leveraging procedural generation to benchmark reinforcement learning. In International Conference on Machine Learning, ICML, pp. 2048-2056, 2020.

Kempka, M., Wydmuch, M., Runc, G., Toczek, J., and Jaskowski, W. ViZDoom: A Doom-based AI research platform for visual reinforcement learning. In *IEEE Conference on Computational Intelligence and Games*, CIG, pp. 1-8, 2016.

Kim, Y. Design of low inertia manipulator with high stiffness and strength using tension amplifying mechanisms. IEEE/RSJ International Conference on Intelligent Robots and Systems, IROS, pp. 5850-5856, 2015.

Laskey, M., Lee, J., Fox, R., Dragan, A., and Goldberg, K. Dart: Noise injection for robust imitation learning. arXiv preprint arXiv:1703. 09327, 2017.

Mishra, N., Rohaninejad, M., Chen, X., and Abbeel, P. A simple neural attentive meta-learner. In International Conference on Learning Representations, ICLR, 2018.

Nasiriany, S., Pong, V., Lin, S., and Levine, S. Planning with goal-conditioned policies. In Advances in Neural Information Processing Systems, NeurIPS, pp. 14814-14825, 2019.

Neu, G. and Szepesvari, C. Apprenticeship learning using inverse reinforcement learning and gradient methods. arXiv preprint arXiv:1206. 5264, 2012.

Ng, A. Y., Harada, D., and Russell, S. Policy invariance under reward transformations: Theory and application to reward shaping. In Proceedings of the 16th International Conference on Machine Learning (ICML), pp. 278-287. Morgan Kaufmann, 1999.

Nichol, A., Achiam, J., and Schulman, J. On first-order meta-learning algorithms. arXiv preprint arXiv:1803.02999, 2018.

Ozan Sener and Vladlen Koltun. Multi-task learning as multi-objective optimization. In Advances in Neural Information Processing Systems, NeurIPS, pp. 527-538, 2018.

Paine, T. L., Colmenarejo, S. G., Wang, Z., Reed, S., Aytar, Y., Pfaff, T., Hoffman, M. W., Barth-Maron, G., Cabi, S., Budden, D., et al. One-shot high-fidelity imitation: Training large-scale deep nets with RL. arXiv preprint arXiv:1810.05017, 2018.

Pomerleau, D. Efficient training of artificial neural networks for autonomous navigation. Neural Computation, 3(1): 88-97, 1991.

Rajaraman, N., Yang, L., Jiao, J., and Ramchandran, K. Toward the fundamental limits of imitation learning. In Advances in Neural Information Processing Systems, NeurIPS, 2020.

Ross, S. and Bagnell, D. Efficient reductions for imitation learning. In International Conference on Artificial Intelligence and Statistics, AISTATS, pp. 661-668, 2010.

Ross, S., Gordon, G. J., and Bagnell, J. A. No-regret reductions for imitation learning and structured prediction. In AISTATS. Citeseer, 2011.

Rothkopf, C., Ballard, D., and Hayhoe, M. Task and context determine where you look. Journal of Vision, 7(14), 2007.

Sanjeev Arora, Simon S. Du, Sham Kakade, Yuping Luo, and Nikunj Saunshi. Provable representation learning for imitation learning via bi-level optimization. In International Conference on Machine Learning, ICML, 2020.

Santara, A., Naik, A., Ravindran, B., Das, D., Mudigere, D., Avancha, S., and Kaul, B. Rail: Risk-averse imitation learning. arXiv preprint arXiv:1707.06658, 2017.

Schulman, J., Wolski, F., Dhariwal, P., Radford, A., and Klimov, O. Proximal policy optimization algorithms. arXiv preprint arXiv:1707. 06347, 2017.

Sener, O. and Koltun, V. Multi-task learning as multiobjective optimization. In Advances in Neural Information Processing Systems, NeurIPS, pp. 527-538, 2018.

Seungsu Kim and Stephane Doncieux. Learning highly diverse robot throwing movements through quality-diversity search. In Genetic and Evolutionary Computation Conference, pp. 1177-1178, 2017.

Sieb, M., Xian, Z., Huang, A., Kroemer, O., and Fragkiadaki, K. Graph-structured visual imitation. In Conference on Robot Learning (CoRL), pp. 979-989. PMLR, 2020.

Singh, A., Jang, E., Irpan, A., Kappler, D., Dalal, M., Levine, S., Khansari, M., and Finn, C. Scalable multitask imitation learning with autonomous improvement. In IEEE International Conference on Robotics and Automation, ICRA, pp. 2167-2173, 2020.

Soroush Nasiriany, Vitchyr Pong, Steven Lin, and Sergey Levine. Planning with goal-conditioned policies. In Advances in Neural Information Processing Systems, NeurIPS, pp. 14814-14825, 2019.

Sudeep Dasari et al: "Transformers for One-Shot Visual Imitation", arxiv.org, Cornell University Library, 201 Olin Library Cornell University Ithaca, NY 14853, Nov. 11, 2020 (Nov. 11, 2020), XP081811772.

Tay, Y., Dehghani, M., Bahri, D., and Metzler, D. Efficient transformers: A survey. arXiv preprint arXiv:2009.06732, 2020.

Tianhe Yu, Chelsea Finn, Sudeep Dasari, Annie Xie, Tianhao Zhang, Pieter Abbeel, and Sergey Levine. One-shot imitation from observing humans via domain-adaptive meta-learning. In Robotics: Science and Systems, RSS, 2018.

Todd Hester, Matej Vecerik, Olivier Pietquin, Marc Lanctot, Tom Schaul, Bilal Piot, Dan Horgan, John Quan, Andrew Sendonaris, Ian Osband, Gabriel Dulac-Arnold, John P. Agapiou, Joel Z. Leibo, and Audrunas Gruslys. Deep Q-learning from demonstrations. In Proceedings of the AAAI Conference on Artificial Intelligence, vol. 32, 2018.

Todorov, E., Erez, T., and Tassa, Y. MuJoCo: A physics engine for model-based control. In IEEE/RSJ International Conference on Intelligent Robots and Systems, IROS, pp. 5026-5033, 2012.

Tuomas Haarnoja, Aurick Zhou, Pieter Abbeel, and Sergey Levine. Soft Actor-Critic: Off-Policy Maximum Entropy Deep Reinforcement Learning with a Stochastic Actor. arXiv preprint arXiv:1801. 01290, 2018.

Uddeshya Upadhyay, Nikunj Shah, Sucheta Ravikanti, and Mayanka Medhe. Transformer based reinforcement learning for games. arXiv preprint arXiv:1912.03918, 2019.

Van der Maaten, L. and Hinton, G. Visualizing data using t-SNE. Journal of Machine Learning Research, 9:2579-2605, 2008.

Vaswani, A., Shazeer, N., Parmar, N., Uszkoreit, J., Jones, L., Gomez, A. N., Kaiser, L., and Polosukhin, I. Attention is all you need. In Advances in Neural Information Processing Systems, NIPS, pp. 5998-6008, 2017.

Venuto, D., Boussioux, L., Wang, J., Dali, R., Chakravorty, J., Bengio, Y., and Precup, D. Avoidance learning using observational reinforcement learning. arXiv preprint arXiv:1909.11228, 2019.

(56) References Cited

OTHER PUBLICATIONS

Wang, Z. and Liu, J.-C. Translating math formula images to latex sequences using deep neural networks with sequence-level training. International Journal on Document Analysis and Recognition (IJDAR), pp. 1-13, 2020.

Will Dabney, Georg Ostrovski, David Silver, and Rémi Munos. Implicit quantile networks for distributional reinforcement learning. In International Conference on Machine Learning, ICML, pp. 1104-1113, 2018.

Wonjoon Goo and Scott Niekum. One-shot learning of multi-step tasks from observation via activity localization in auxiliary video. In International Conference on Robotics and Automation, ICRA, pp. 7755-7761, 2019.

Wu, Y.-H., Charoenphakdee, N., Bao, H., Tangkaratt, V., and Sugiyama, M. Imitation learning from imperfect demonstration. arXiv preprint arXiv:1901.09387, 2019.

Xiao, H., Herman, M., Wagner, J., Ziesche, S., Etesami, J., and Linh, T. H. Wasserstein adversarial imitation learning. arXiv preprint arXiv:1906.08113, 2019.

Xiaoxiao Guo, Shiyu Chang, Mo Yu, Gerald Tesauro, and Murray Campbell. Hybrid reinforcement learning with expert state sequences. In AAAI Conference on Artificial Intelligence, AAAI, pp. 3739-3746, 2019.

Yan Duan, Marcin Andrychowicz, Bradly Stadie, Jonathan Ho, Jonas Schneider, Ilya Sutskever, Pieter Abbeel, and Wojciech Zaremba. One-shot imitation learning. In Advances in Neural Information Processing Systems, NIPS, pp. 1087-1098, 2017.

Yiming Ding, Carlos Florensa, Pieter Abbeel, and Mariano Phielipp. Goal-conditioned imitation learning. In Advances in Neural Information Processing Systems, NeurIPS, pp. 15298-15309, 2019.

Yu, L., Yu, T., Finn, C., and Ermon, S. Meta-inverse reinforcement learning with probabilistic context variables. In Advances in Neural Information Processing Systems, NeurIPS, pp. 11749-11760, 2019.

Yu, T., Finn, C., Dasari, S., Xie, A., Zhang, T., Abbeel, P., and Levine, S. One-shot imitation from observing humans via domain-adaptive meta-learning. In Robotics: Science and Systems, RSS, 2018.

Yu, T., Quillen, D., He, Z., Julian, R., Hausman, K., Finn, C., Levine, S., Pong, V., et al. Meta-World source code. https://github.com/rlworkgroup/metaworld, 2019.

European Search Report for European Application No. EP21305799.5 dated Jan. 4, 2022.

\* cited by examiner

DEMONSTRATION-CONDITIONED REINFORCEMENT LEARNING FOR FEW-SHOT IMITATION

CROSS-REFERENCE TO RELATED APPLICATIONS

This application claims the benefit of European Application No. EP21305799, filed on Jun. 10, 2021. The entire disclosure of the application referenced above is incorporated herein by reference.

FIELD

The present disclosure relates to few-shot imitation and, more particularly, to a policy network for a few-shot imitation agent.

BACKGROUND

Humans may owe their success to their uniquely developed ability to learn from others, a core component of which is the capacity to imitate. While humans often only need a few demonstrations to learn to perform a task. Imitation learning by computing devices, however, may involve prohibitively many demonstrations even to learn simple tasks. This has motivated the study of few-shot imitation, in which an aim is to maximize the expected performance of an agent that must complete a previously unseen task for which the agent is not trained, having only seen a few demonstrations of that task. For instance, a person might demonstrate how to close a window and then expect a robot to close that window, even though the robot has never been trained to close the window before, and even though the window's initial state may not be the same as it was in the demonstration.

Few-shot imitation may be motivated by a desire to enable artificial agents (e.g., embodied in control modules of computing devices) to perform a diverse range of tasks, and a hope that a single few-shot imitation agent, trained on a representative set of tasks, can build a representation that enables it to generalize to large numbers of new tasks with an acceptable and limited number of demonstrations.

Few-shot imitation systems may use behavior cloning (BC), in which the agent is trained to minimize an action-prediction loss or inverse reinforcement learning (IRL) to infer a reward function from the demonstrations and then to train a policy for that reward function. Such systems, however, may suffer from one or more of the following limitations. They assume actions are part of the demonstration or that different tasks share a common transition distribution. Further, they may ignore domain shift between the agent and the demonstrator, they may not improve upon suboptimal demonstrators, or they may train a policy each time they are presented with demonstrations of a new task. All of these limitations are practically important to address, for instance for robots inferring policies from human demonstrations.

There is a need to address the problem of inefficient and underperforming few-shot imitation agents and the training thereof.

SUMMARY

To address the challenges in the state of the art, novel methods and systems (e.g., including agents) for performing few-shot imitation are disclosed.

In an embodiment, a computer-implemented method includes obtaining at least one set of training data. Each set of training data is associated with a task, such as a known task for training a policy network, and includes at least one of samples of rewards and a reward function, and at least one of samples of state transitions and a transition distribution. The computer-implemented method includes training a policy network of an agent (e.g., embodied in a computer control module) using reinforcement learning by inputting at least one set of first demonstrations of the at least one set of training data into the policy network and by maximizing a risk measure, such as the conditional value-at-risk (CVaR) using so-called distributional RL, or an average return over the at least one set of first demonstrations of the at least one set of training data based on respective one or more reward functions or respective samples of rewards, obtaining a set of second demonstrations associated with a new task, and inputting the set of second demonstrations and an observation of a state of the agent into the trained policy network for performing the new task. The samples of rewards and/or the samples of state transitions may be obtained from a simulation, or from offline data, which may be data collected from a real system, prior to the training.

By training a policy network of an agent and by inputting a set of second demonstrations and an observation of a state in the trained policy network for performing a new task, an improved method for efficiently performing few-shot imitation is provided.

According to various features, the policy network includes at least one of a first self-attention mechanism for processing the set of second demonstrations, a second self-attention mechanism for processing the observation of the state, and a cross-attention mechanism for processing the set of second demonstrations and the observation of the state. For example, the policy network includes a transformer-based policy network. The transformer-based policy network may include at least one transformer (transformer architecture) with axial attention. The inputted at least one set of first demonstrations may be encoded as a first multi-dimensional tensor, and attention of a first transformer of the at least one transformer may be applied along a single axis of the first multi-dimensional tensor, e.g., without flattening the multi-dimensional tensor. Alternatively or additionally, the inputted set of second demonstrations may be encoded as a second multi-dimensional tensor, and attention of a second transformer of the at least one transformer may be applied along a single axis of the second multi-dimensional tensor. By using transformers with axial attention, an efficient method for training the policy network is provided. Specifically, transformers with axial attention efficiently process multiple input demonstrations, videos of a single demonstration or any other multi-dimensional input.

In various features, self-attention and cross-attention mechanisms can be used instead of transformers or transformer networks for the same purpose. In embodiments, self-attention and cross-attention mechanisms other than transformers are used instead of transformers, e.g., a self-attention mechanism may be used for processing a set of demonstrations and/or an observation, and a cross-attention mechanism may be used for processing a set of demonstrations and an observation. In various implementations, no attention mechanisms may be used. For example, instead of one or more attention mechanisms, a S4 sequence model may be implemented. Details of the S4 sequence model can be found on the Internet at openreview.net/forum?id=uYLFoz1vIAC, which is incorporated herein in its entirety.

In features, the obtaining a set of second demonstrations associated with a new task, and inputting the set of second demonstrations and an observation of a state into the trained policy network for performing the new task are performed at inference time or at runtime of the agent. The obtaining at least one set of training data, and training a policy network using reinforcement learning may be performed during training time.

In aspects, the inputting the at least one set of first demonstrations of the at least one set of training data into the policy network for training the policy network includes inputting at least one of a state of the agent, a state-action pair, an observation history and an observation-action history into the policy network for training the policy network. The at least one set of first demonstrations of the at least one set of training data may include demonstrations of at least two tasks, and the average return may be maximized over the at least one set of first demonstrations of the at least one set of training data by maximizing an average cumulative reward over the at least two tasks. By using training data associated with a plurality of tasks, the policy network provides improved results for performing new tasks, due to a better generalization of the policy network.

The method may further include obtaining or determining, by the trained policy network, a distribution of one or more actions based on the observation of the state and the set of second demonstrations. The new task and at least one task associated with the at least one set of training data may be related, e.g., an optimal policy for the new task may be similar to an optimal policy for the at least one task. The new task and at least one task associated with at least one set of training data may be different, or the new task and all tasks associated with at least one set of training data may be different.

In an embodiment, an agent includes a pre-trained policy network for performing at least one task. The agent is configured to obtain a set of first demonstrations and an observation as input for the pre-trained policy network, input the set of first demonstrations and the observation into the pre-trained policy network for performing a task associated with the first demonstrations, and determine, by the pre-trained policy network, at least one action to be performed based on the inputted set of first demonstrations and the inputted observation. A pre-trained policy network may be trained using reinforcement learning. For example, the pre-trained policy network may include a demonstration-conditioned policy network trained with reinforcement learning on a set of training tasks using a set of training demonstrations for each training task of the set of training tasks.

The pre-trained policy network may include at least one of a first self-attention mechanism for processing the set of first demonstrations, a second self-attention mechanism for the observation and a cross-attention mechanism for processing the set of first demonstrations and the observation. For example, the pre-trained policy network may include a pre-trained transformer-based policy network. The pre-trained transformer-based policy network may include at least one transformer with axial attention. A demonstration of the set of first demonstrations may be a sequence of observations of a random length. The observation may include at least one of a state-action pair, a state, a position, an image and a sensor measurement. The set of first demonstrations received from a demonstrator.

In a feature, a robot includes the agent comprising the pre-trained policy network for performing at least one task, where the task includes a manipulation task for manipulating an object, and where the observation comprises information about the robot or one or more parts of the robot, where the set of first demonstrations include a sequence of positions and/or orientations of the robot or the one or more parts of the robot, and where at least one actuator or motor of the robot is controlled based on the determined action to be performed to modify a state of an environment. A manipulation task may be defined as the task of modifying, by using a robot, in a purposeful manner the state of an environment including of objects while respecting constraints related to the environment and the mechanical properties of the robot.

In a feature, a robot includes the agent including the pre-trained policy network for performing at least one task. The task may include a navigation task for navigating the robot or a part of the robot. The observation may include a position of the robot or the part of the robot. The set of first demonstrations may include a sequence of positions of the robot or the part of the robot. At least one actuator or motor of the robot may be controlled based on the determined action to be performed. By providing a robot including the agent including the pre-trained policy network for performing a navigation task, an improved robot is achieved that allows for mapless or trajectory-based navigation based on positional or visual observations.

In a further feature, a computer-readable storage medium having computer-executable instructions stored thereon is provided. When executed by one or more processors, the computer-executable instructions perform the method for performing few-shot imitation described herein.

In a further feature, an apparatus comprising processing circuitry is provided. The processing circuitry is configured to execute the agent described above.

In a feature, a method, performed by a processor and memory, embodied in an agent comprising a trained policy network for performing at least one task is described. The method includes: obtaining a set of first demonstrations and an observation as input for the trained policy network; inputting the set of first demonstrations and the observation into the trained policy network for performing a task associated with the first demonstrations; and determining, by the trained policy network, at least one action to be performed based on the inputted set of first demonstrations and the inputted observation, where the trained policy network is trained using reinforcement learning.

In further features, the method further includes determining at least one action comprising at least one of controlling a robot or a part of the robot, controlling a machine, controlling a vehicle, and manipulating a state of an environment.

In further features, the trained policy network has the transformer architecture with axial attention.

In further features, the trained policy network includes at least one of a first self-attention module for processing the set of first demonstrations, a second self-attention module for processing the observation, and a cross-attention module for processing the set of first demonstrations and the observation.

In further features, a demonstration of the set of first demonstrations includes a sequence of observations, wherein each of the observations includes at least one of a state-action pair, a state, a position, an image, and a sensor measurement.

In further features: the task includes a manipulation task for manipulating an object by a robot; the observation includes information on one or more parts of the robot; the set of first demonstrations includes a sequence including at least one of positions and orientations of the one or more parts of the robot; and the method further includes controlling at least one actuator of the robot based on the determined action to be performed.

In further features: the task includes a navigation task for navigating a robot; the observation includes information on one or more parts of the robot; the set of first demonstrations includes a sequence of positions of the robot; and the method further includes controlling at least one actuator of the robot based on the determined action to be performed.

In a feature, a computer-implemented method for performing few-shot imitation includes: obtaining at least one set of training data, wherein each set of training data is associated with a task and includes (i) at least one of samples of rewards and a reward function, (ii) at least one of samples of state transitions and a transition distribution, and (iii) a set of first demonstrations; training a policy network embodied in an agent using reinforcement learning by: inputting at least one set of first demonstrations of the at least one set of training data into the policy network; and maximizing a risk measure or an average return over the at least one set of first demonstrations of the at least one set of training data based on respective one or more reward functions or respective samples of rewards; obtaining a set of second demonstrations associated with a new task not included in the training data; and inputting the set of second demonstrations and an observation of a state into the trained policy network for performing the new task.

In further features, the policy network includes one of: the transformer architecture with axial attention; and at least one of a first self-attention module configured to process the set of second demonstrations, a second self-attention module configured to process the observation of the state, and a cross-attention module configured to process the set of second demonstrations and the observation of the state.

In further features, the policy network includes the transformer architecture with axial attention and the computer-implemented method further comprises at least one of: encoding the inputted at least one set of first demonstrations as a first multidimensional tensor and applying attention by a first transformer of the policy network is along a single axis of the first multidimensional tensor; and encoding the inputted set of second demonstrations as a second multidimensional tensor and applying attention of a second transformer of the policy network along a single axis of the second multidimensional tensor.

In further features, at least one of: the obtaining a set of second demonstrations associated with a new task and the inputting the set of second demonstrations and an observation of a state into the trained policy network for performing the new task are performed at inference time; and the obtaining at least one set of training data and training a policy network using reinforcement learning are performed during training time.

In further features, the inputting the at least one set of first demonstrations of the at least one set of training data into the policy network to train the policy network includes inputting at least one of a state of the agent, a state-action pair, and an observation-action history into the policy network for training the policy network.

In further features, the at least one set of first demonstrations of the at least one set of training data include demonstrations of at least two tasks, and wherein maximizing the average return over the at least one set of first demonstrations of the at least one set of training data includes maximizing an average cumulative reward over the at least two tasks.

In a feature, a system includes: a control module including a policy network that: is trained based on a set of training tasks; and includes the transformer architecture with axial attention on a single axis of a multi-dimensional tensor generated by the transformer architecture; and a training module configured to: input to the policy network a set of demonstrations for a task that is different than the training tasks; and train weight parameters of encoder modules of the transformer architecture based on the single axis of the multi-dimensional tensor generated based on the input set of demonstrations.

In further features, the training module is configured to train the weight parameters of the encoder modules based on maximizing an average return of the policy network.

In further features, the control module is configured to selectively actuate an actuator based on an output of the policy network.

In further features, the transformer architecture includes an encoding module configured to generate the multi-dimensional tensor based on the set of demonstrations.

In further features, each demonstration of the set of demonstrations includes a time series of observations.

In further features, the time series of observations are of random lengths.

In further features, each observation includes at least one of: a state-action pair; a state; a position; an image; and a measurement.

In further features, the task is manipulating an object, and wherein the set of demonstrations includes a sequence of positions and orientations of a robot.

In further features, the task includes navigating toward a target position, and wherein the set of demonstrations includes a sequence of positions of a navigating robot.

In further features, the policy network includes L encoder layers connected in series, wherein L is an integer greater than one.

In further features, the policy network further includes L decoder layers configured to determine an action based on an output of the L encoder layers.

In further features, a processor executing instructions stored in a memory is described where the instructions stored in the memory further comprise instructions for the control module, including the policy network, and the training module.

In further features, the instructions further comprise instructions for training the policy network with the training tasks using reinforcement learning.

In further features, the instructions further comprise instructions for an agent, including the policy network, that is configured to determine at least one action to be performed based the set of demonstrations for the task that is different than the training tasks.

In further features, the at least one action is a navigation action.

In further features, the agent determines the navigation action for a robot.

In further features, the instructions using reinforcement learning use proximal policy optimization.

The following detailed description and accompanying drawings provide a more detailed understanding of the nature and advantages of the present invention.

BRIEF DESCRIPTION OF THE DRAWINGS

The accompanying drawings are incorporated into and form a part of the specification for the purpose of explaining the principles of the embodiments. The drawings are not to be construed as limiting the embodiments to only the illustrated and described embodiments of how they can be made and used. Further features and advantages will become apparent from the following and more particularly from the description of the embodiments, as illustrated in the accompanying drawings, wherein.

DETAILED DESCRIPTION

Described herein are systems and methods for few-shot imitation. For purposes of explanation, numerous examples and specific details are set forth in order to provide a thorough understanding of the described embodiments. Embodiments as defined by the claims may include some or all of the features in these examples alone or in combination with other features described below, and may further include modifications and equivalents of the features and concepts described herein. The illustrative examples will be described with reference to the drawings wherein elements and structures are indicated by reference numbers. Further, where an embodiment is a method, functions, and elements of the method may be combinable in parallel or sequential execution or execution in a different order. As far as they are not contradictory, portions of each embodiment described below can be combined with each other.

Imitation learning is not a necessary component of few-shot imitation. Described herein are systems and methods for few-shot learning that do not include BC or IRL few-shot learning. Single-task imitation learning may be used. The disclosed approach may be referred to as demonstration-conditioned reinforcement learning (DCRL).

Figure 3A:
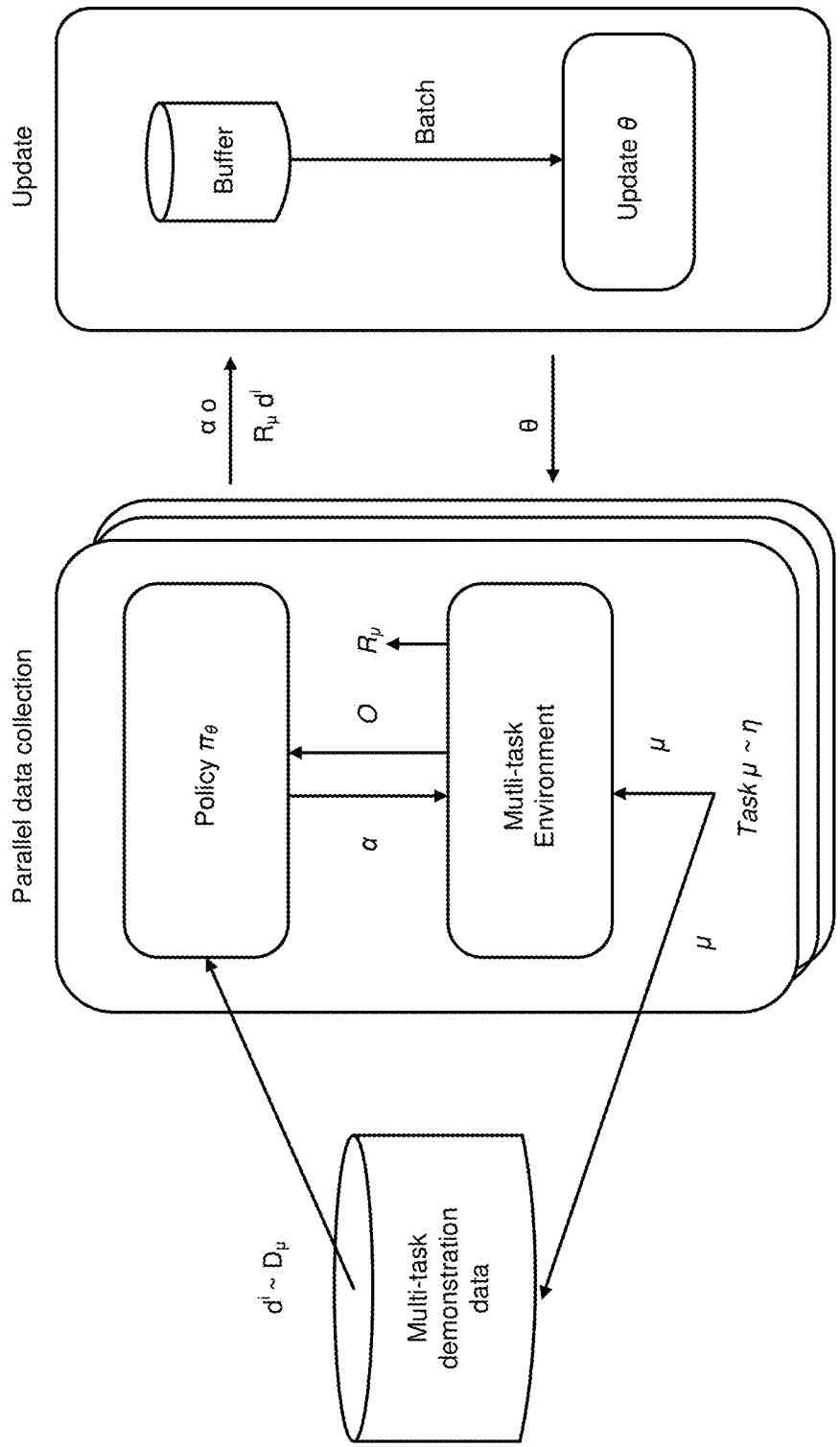
FIG. 3A illustrates a flowchart depicting an example method for training a policy network.

In DCRL, a training set may include demonstrations, one of samples of rewards and reward functions, and one of samples of state transitions and a transition distribution for multiple tasks, such as shown in FIG. 3A. The tasks are shown stacked in the example of FIG. 3A.

Policies or policy networks of an agent (e.g., a control module of a computing device) may receive demonstrations as input in addition to an agent's state or observation-action history. To train the policy or policy network, an average cumulative reward may be maximized over a set of training tasks. At inference time, demonstrations of a new task may be input into the trained policy or policy network, along with observations of the state, and actions may be output by the trained policy or policy network. Demonstrations serve to inform the agent about the task's objective, they serve as examples of how to perform the task, and they may also be informative about the transition distribution if this differs from one task to another. However, DCRL can also be directly applied in situations with a different relationship between demonstrations and tasks, such as for avoidance learning.

DCRL has several advantages over other approaches to few-shot imitation learning. With no special modifications, DCRL accepts demonstrations that include state-only observations, DCRL can address situations with a domain shift between the demonstrator and the agent, DCRL can improve upon suboptimal demonstrations, and/or DCRL requires no additional training when presented with demonstrations of a new task.

If a single demonstration is not enough to impart the objective of a new task, cross-demonstration attention over multiple input demonstrations can be used. The computational cost of few-shot imitation involving polices utilizing the transformer architecture may be prohibitive for inputs including multiple demonstrations, each of which is a multivariate time series. Transformers with axial attention may provide a more efficient alternative architecture for such inputs and may be used as they attend to temporal and demonstration dimensions of the input independently. The transformer architecture is described in U.S. Pat. No. 10,452,978, which is incorporated herein in its entirety. The transformer architecture is also described in Ashish Vaswani, Noam Shazeer, Niki Parmar, Jakob Uszkoreit, Llion Jones, Aidan N Gomez, Łukasz Kaiser, and Illia Polosukhin, "Attention is all you need", In I. Guyon, U. V. Luxburg, S. Bengio, H. Wallach, R. Fergus, S. Vishwanathan, and R. Garnett, editors, Advances in Neural Information Processing Systems 30, pages 5998-6008, Curran Associates, Inc., 2017, which is incorporated herein in its entirety.

For DCRL, cross-demonstration attention, enabled by the transformer architecture with axial attention for policy architecture may be used. Results on robotic manipulation and navigation benchmarks, demonstrating DCRL's superior performance compared with other alternatives, as well as its ability to improve on suboptimal demonstrations and to cope with domain shifts are presented.

Figure 1:
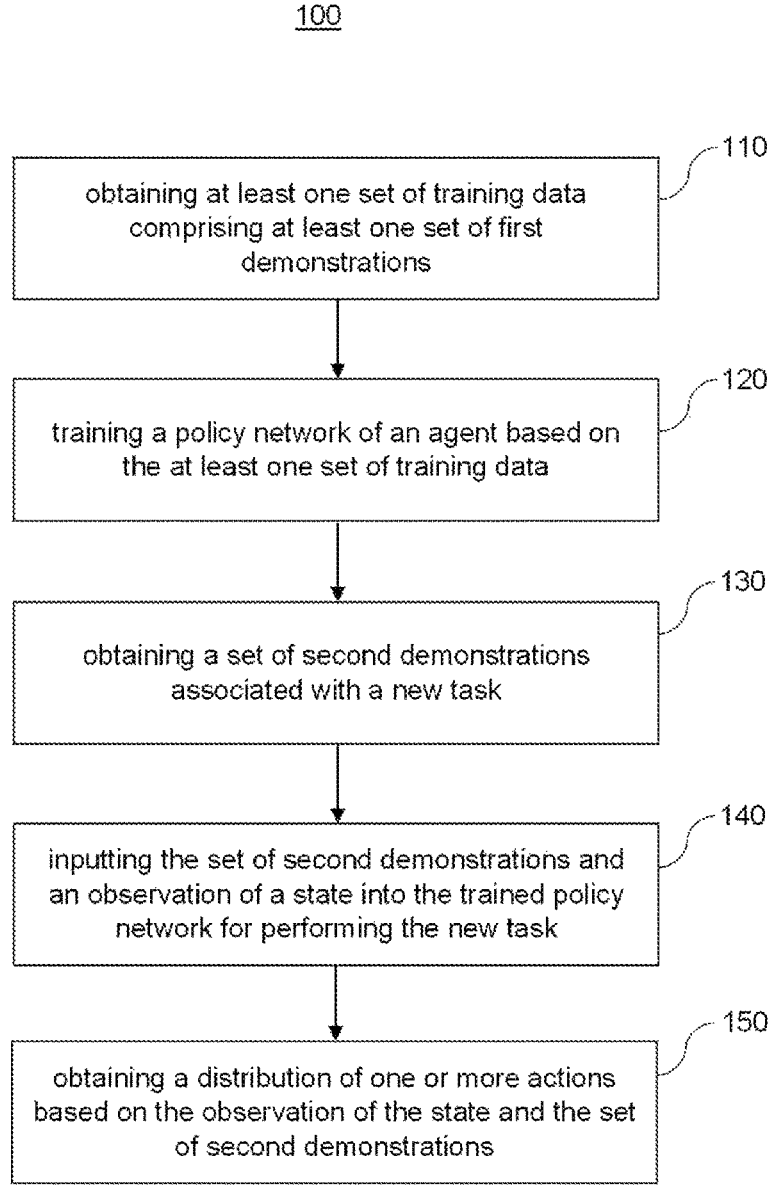
FIG. 1 illustrates a flowchart depicting an example method for performing few-shot imitation.

FIG. 1 is a flowchart depicting an example method 100 for performing few-shot imitation learning. At 110, the method 100 includes a training module obtaining at least one set of training data, where each set of training data is associated with a task, e.g., a training task. Each set of training data includes at least one of samples of rewards and a reward function, at least one of samples of state transitions and a transition distribution, and a set of first demonstrations. A demonstration of the set of first demonstrations may be a sequence of observations of a random length. An observation includes at least one of a state-action pair, a state, a position, an image, and a sensor measurement.

At 120, the method 100 includes the training module training a policy network of an agent (e.g., a control module of a computing device) using reinforcement learning based on the at least one set of training data, such as based on a plurality of sets of training data. The training may be performed in accordance with the method of FIG. 2 and include 210 to 240.

At 130, the training module obtains a set of second demonstrations associated with a new task for performance by the agent. The set of second demonstrations may be provided by a demonstrator. The demonstrator may be a human, and the set of second demonstrations may be received via one or more user input devices, such as one or more joysticks or other types of user input devices. The new task may be related with tasks associated with the at least one set of training data. For example, the new task and the tasks associated with the at least one set of training data may have a similar optimal policy. In various implementations, the new task and at least one task associated with at least one set of training data may be different. Alternatively, the new task and all tasks associated with at least one set of training data may be different. The set of second demonstrations may include less than a predetermined number of demonstrations, such as 5 or another suitable number. This may allow for few-shot imitation learning using only a limited number (less than the predetermined number) of demonstrations.

At 140, the training module inputs the set of second demonstrations and an observation of a state of the agent to the trained policy network for performing the new task.

At 150, the training module obtains a distribution of one or more actions taken by the trained policy network based on the observation of the state and the set of second demonstrations. The training module may train the policy network based on the distribution, such as by adjusting one or more weight parameters of the policy network based on the distribution.

110 and 120 are performed during the training. 130, 140, and 150 may be performed at inference time, such as at runtime of the agent.

Figure 2:
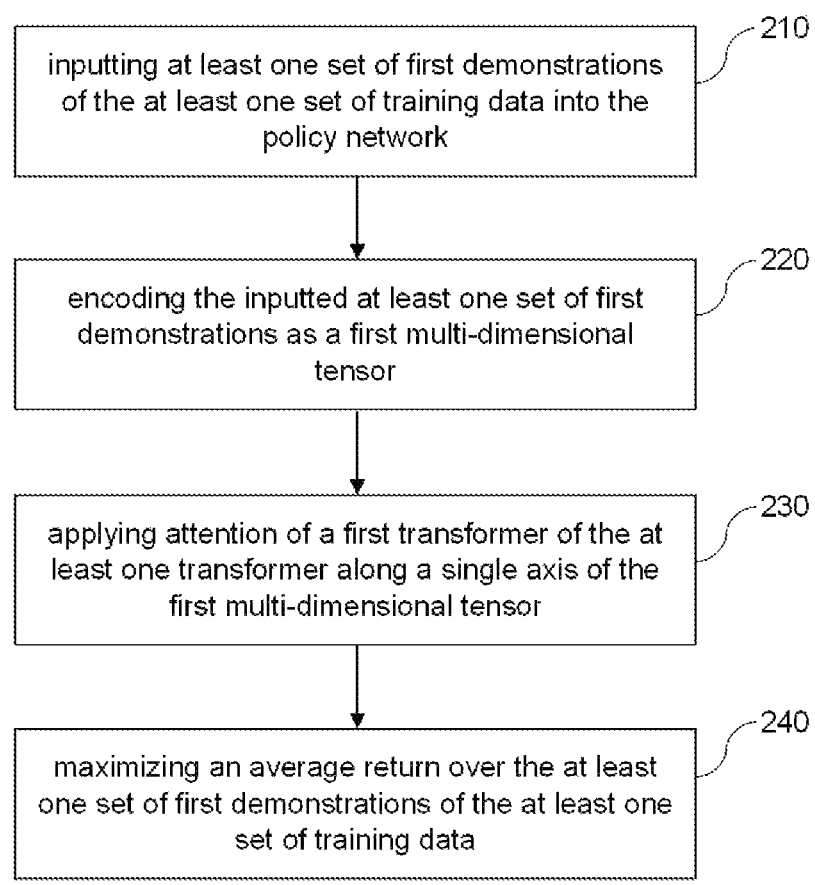
FIG. 2 illustrates a flowchart depicting an example method for training a policy network.

FIG. 2 is a flowchart depicting an example method 200 for training a policy network of an agent.

At 210, the training module inputs at least one set of first demonstrations, e.g., a plurality of sets of first demonstrations, of the at least one set of training data to the policy network. In addition, the training module inputs at least one of a state of the agent, a state-action pair, and an observation-action history to the policy network for training the policy network.

At 220, the policy network encodes or embeds the at least one set of first demonstrations as a first multi-dimensional tensor.

At 230, attention of a first transformer of the at least one transformer may be applied along a single axis of the first multi-dimensional tensor to determine the action to take.

At 240, the training module trains the policy network based on maximizing an average return over the at least one set of first demonstrations of the at least one set of training data based on reward functions of the training data or samples of rewards. Alternatively, the training module may train the policy network based on maximizing a risk measure over the at least one set of first demonstrations of the at least one set of training data based on respective one or more reward functions or respective samples of rewards.

FIG. 3A shows an example DCRL algorithm according to the present application, which uses both demonstrations and environment interactions to train a policy network of an agent (e.g., embodied in a control module of a computing device).

Tasks may be sampled from a distribution of tasks $\eta$. Each task $\mu \sim \eta$ is associated with a Markov decision process $M_\mu$ and a distribution over collections of demonstrations $D_\mu$. $\Delta(X)$ denotes a set of probability distributions over a set X. The Markov decision process $M_\mu := (S, A, \rho_\mu, P_\mu, R_\mu, \gamma)$ has a set of states S, a set of actions A, initial-state distribution $\rho_\mu \in \Delta(S)$, transition distribution $P_\mu: S \times A \to \Delta(S)$, random reward $R_\mu$ which is a mapping from $S \times A$ to the space of real-valued random variables, and a discount factor $\gamma \in [0, 1]$. $S := \cup_\mu S_\mu$ or $A := \cup_\mu A_\mu$ are defined if these sets depended on $\mu$. Both infinite-horizon settings are considered with $\gamma < 1$, and episodic settings with $\gamma \le 1$, which are modeled by assuming that some states are absorbing and provide zero reward.

Let $H := \{(s_0, \alpha_0, \ldots, \alpha_{t-1}, s_t): s_i \in S, i \le t, \alpha_j \in A, j < t, t \in \mathbb{Z}_{\ge 0}\}$ be the space of state-action histories, and let $\Pi = \{\pi: H \to \Delta(A)\}$ be the space of policies, which map such histories to distributions over actions. Let the expected return (reward) of policy $\pi \in \Pi$ on task $\mu$ be $J_\mu(\pi) = \mathbb{E}_{\mu,\pi}[\Sigma_{t=0}^\infty \gamma^t R_\mu(s_t, \alpha_t)]$, where $\mathbb{E}_{\mu,\pi}$ is the expectation over state-action sequences $(s_0, a_0, s_1, a_1, \ldots)$ sampled from $\rho_\mu, P_\mu$ and $\pi$. For each task $\mu$, it may be assumed that the Markov decision process $M_\mu$ is such that $J_\mu(\cdot)$ exists for a policy, and that an optimal (trained) policy exists that maximizes $J_\mu(\cdot)$. Let $J_\mu^*$ be the expected return of an optimal policy.

A demonstration includes a sequence $d := (o_0, o_1, \ldots, o_{T-1})$ of observations $o_t \in \Omega$ of random length $T \in \mathbb{Z}_{\ge 0}$. Observations might be state-action pairs so that $\Omega \subseteq S \times A$, observations might be states so that $\Omega \subseteq S$, or observations might be images or some other sensor measurements and/or estimates that only provide partial information about the state. Such observations may come from a demonstrator module. Observations need not be associated with the Markov decision process $M_\mu$. The set of all observation sequences of finite non-zero length may be denoted by $\Omega^+$, using, for example, Kleene plus operation.

Collections of demonstrations of task $\mu$ are sampled from a distribution $D_\mu$. A collection of demonstrations $d := (d_0, \ldots, d_{n-1}) \sim D_\mu$ includes a number $n \in \mathbb{Z}_{\ge 0}$ of individual demonstrations, such as a random number of individual demonstrations. The set of collections of demonstrations may be denoted by $D := (\Omega^+)^+$.

Few-shot imitation may be described by a distribution $\eta$ over tasks, and for each task $\mu$ a Markov decision process $M_\mu$ and a distribution $D_\mu$ over collections of demonstrations, as described above. The aim may be to train the agent $\alpha: D \to \Pi$, which maps a collection of demonstrations $d \sim D_\mu$ of a task $\mu \sim \eta$ to a policy, so as to maximize the average return over the tasks:

$$\max_{\alpha: D \to \Pi} \mathbb{E}_{\mu \sim \eta} \mathbb{E}_{d \sim D_\mu} J_\mu(\alpha(d)).$$

It may be assumed that a policy is given by a probability mass or density function over the actions A. With this assumption, the aim above may be equivalent to finding a demonstration-conditioned policy $\pi$ that determined or assigns a probability $\pi(\alpha|h, d)$ for/to an action a, given a history h and demonstrations d, which maximizes the function $$\mathbb{E}_{\mu \sim \eta} \mathbb{E}_{d \sim D_\mu} \mathbb{E}_{\mu, \pi(\cdot|\cdot, d)} \left[ \sum_{t=0}^\infty \gamma^t R_\mu(s_t, a_t) \right] \quad (1)$$

Described herein is DCRL which takes a simple and direct approach to few-shot imitation. The input is a training set which can be described by $$X := \{(d^i, M_{\mu^i})\}_{i=0}^{N-1},$$

where each $d^i \in D$ is a collection of demonstrations of a task $\mu^i$ and $M_{\mu^i}$ is the Markov decision process for that task. A demonstration-conditioned policy $\pi$ or policy network is trained by the training module to maximize the empirical average cumulative reward described by $$\frac{1}{N} \sum_{i=0}^{N-1} J_{\mu^i}\left(\pi(\cdot \mid \cdot, d^i)\right).$$

To approximately maximize this objective, the training module may use a reinforcement learning (RL) algorithm in which the demonstration(s) appended can be used to the tuples in the replay buffer, such as shown in Algorithm 1 (line 11).

| Algorithm 1: Demonstration-conditioned reinforcement learning |
|---|
| 1:     Input: Training set X := <br>     $\{(d^i, M_\mu^i)\}_{i=0}^{N-1}$, trainable parameters θ <br> 2:     Buffer ← ∅ <br> 3:     while not converged do <br> 4:       i ~ Uniform({0, . . . , N − 1}) <br> 5:       $s_0$, done ← InitEnvironment($M_\mu^i$) <br> 6:       for t = 0, 1, . . . until done do <br> 7:         $a_t$ ~ $\pi_\theta(\cdot \| h_t, d^i)$ where $h_t = (s_0, a_0, \ldots, s_t)$ <br> 8:         $R_t, s_{t+1}$, done ← EnvironmentStep($M_\mu^i, s_t, a_t$) <br> 9:         Buffer ← Buffer ∪ {($R_t, h_{t+1}$, done, $d^i$)} <br> 10:      end for <br> 11:      if it is time for an update then <br> 12:        θ ← UpdatePolicy(Buffer, θ) <br> 13:      end if <br> 14:    end while <br> 15:    return $\pi_\theta$ |

At Line 1, a training set and initial values for the model parameters are given as input. The training set includes N pairs, each pair including: a collection of demonstrations; and a corresponding Markov decision process (MDP).

In Line 2, the contents of a replay buffer are emptied.

In the loop spanning Lines 3 to 14, the training module performs training updates until some convergence criterion is met. One example set of criteria may be stop if it appears that the model is overfilling on a set of validation tasks, if the performance on the training tasks appears to have plateaued, if the success rate on all training tasks exceeds a threshold, or if the available computational budget has expired. Other sets of criteria may be used. Each iteration of this loop has two stages performed by the training module: populating the replay buffer (Lines 4 to 10); and updating model parameters (Lines 11 to 13).

In Lines 4 and 5, the training module samples the index of one of the demonstration-MDP pairs in the training set, then the training module initializes an environment corresponding to that MDP, returning an initial state or observation and an indicator that the episode (i.e., attempt at performing the task) is done (i.e., already complete). In the loop spanning Lines 6 to 10, the training module populates the replay buffer with one episode in this environment, from this initial state. To do so, the training module repeats the following steps until the done indicator is set: an action is sampled from the demonstration-conditioned policy for the current state-action history (Line 7); the training module gets a reward from the environment, moves to the next state, and updates the indicator that the episode is done (Line 8); and the training module appends this information to the replay buffer as a tuple, which includes the current collection of demonstrations (Line 9).

In Lines 11 to 13, the training module determines if enough data has been collected to make it worthwhile updating the model parameters. For instance, the training module make an update every time a new episode is collected, or every time at least 100 new transitions are added to the replay buffer. In Line 12, the model parameters are updated by the training module using a reinforcement learning algorithm using the data in the replay buffer. The reinforcement learning algorithm may be the proximal policy optimization (PPO) algorithm (described in "Proximal Policy Optimization Algorithms" by Schulman et al, published on arXiv at arxiv.org/abs/1707.06347, which is incorporated herein by reference), but many alternative algorithms could be used. Other examples of reinforcement learning algorithms that could be used include soft actor critic (SAC), implicit quantile network (IQN), double deep Q-network (DDQN), and phasic policy gradients (PPG). Finally, at Line 15, the training module returns the demonstration-conditioned policy that has been learned.

The training module implementing DCRL may produce policies that generalize to new tasks μ which are not present in the training set. For there to exist a policy that attains a high value for the objective of few-shot imitation, the demonstrations carry sufficient information about the nature of the task at hand. For instance, one might consider few-shot imitation problems that are separable in the sense that there exists a mapping α: D→H that attains the upper bound $\mathbb{E}_{\mu\sim\eta}J_\mu^*$ on the objective.

Demonstration-conditioned policies may have a specific structure $\pi(a|h, d)=F(\alpha, h, \Phi(d))$, where $\Phi: D\to\varepsilon$ maps a collection of demonstrations to an embedding space ε, and F maps histories and embeddings to action probabilities.

The embedding function Φ may be considered to be a classifier that maps demonstrations to task identities, and F may be considered to be a policy for each identified task. However, different tasks may have identical optimal policies and are not always distinguishable based on demonstrations. In such situations, even if a classifier mapping demonstrations to task identities does not exist, it may still be possible to attain the upper bound $$\mathbb{E}_{\mu\sim\eta}\mathbb{E}_{d\sim D\mu}J_\mu(F(\cdot|\cdot,\Phi(d)))=\mathbb{E}_{\mu\sim\eta}J_\mu^*$$

on the objective (1). Two collections of demonstrations may be considered close under Φ if they have similar optimal policies, and generalization to new tasks may be achieved by interpolating in this embedding space.

In embodiments, policies with cross-demonstration attention are disclosed, which accept a variable number of demonstrations as input, and which process demonstrations simultaneously, enabling a richer integration of information than is possible by averaging. This advantage may be more clear in the experiments on navigation.

While the results of transformer-based policies may be impressive, computational and memory complexities grow quadratically with the size of their input. This becomes prohibitive when the input include of multiple demonstrations, each of which is a multivariate time series. To overcome this cost, policies including the transformer architecture with axial attention can be used. Axial attention is a technique/mechanism that improves efficiency of a transformer architecture based policy.

Rather than applying attention to a flattened string of tensor elements, the training module may instead apply attention along a single axis of the tensor without flattening, which may be referred to as axial attention. A policy including the transformer architecture with axial attention may represent a self-attention-based autoregressive model for images and other data organized as high/multi-dimensional tensors. A policy including the transformer architecture with axial attention does not change the original shape of the multidimensional data tensor and is configured to perform a masked or unmasked attention over a single axis of the tensor at a time. This operation can be called axial attention, denoted by Attention k(x). Axial attention performs attention over axis k of the tensor x, mixing information along axis k while keeping information along other axes independent.

Figure 3B:
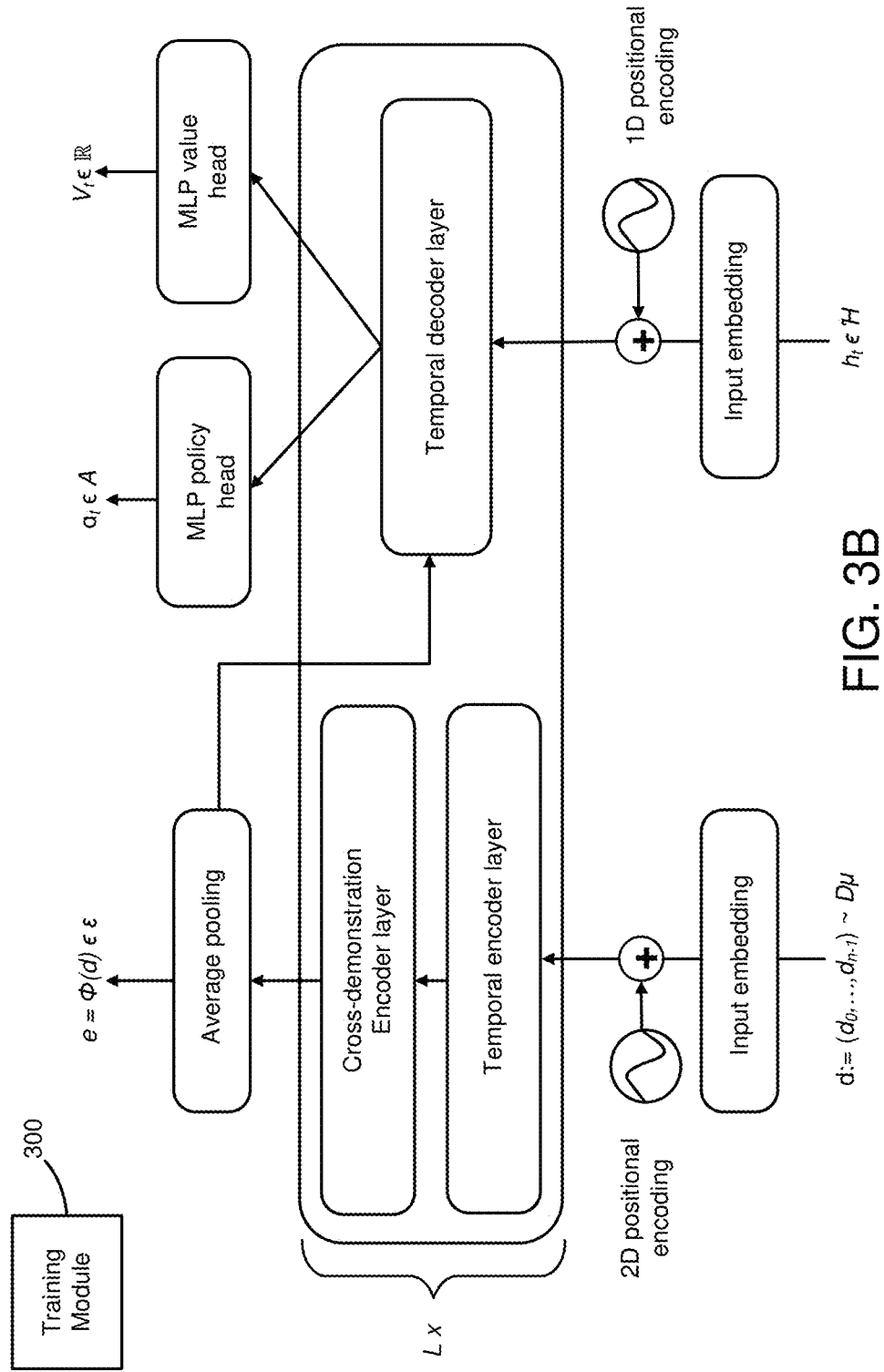
FIG. 3B illustrates a functional block diagram including an example architecture of a policy network.

FIG. 3B includes a functional block diagram of an example implementation of a DCRL policy architecture according to an example. The model receives a collection of demonstrations (d) and the agent's history (h) as input, and outputs the action (policy head, a) and estimated value function (value head, V) based on the inputs.

The policy network has the transformer architecture and includes an encoder module and a decoder module. The encoder module maps a collection of demonstrations to an embedding. The encoder module includes a temporal encoder layer, a cross-demonstration encoder layer, and an average pooling layer. The decoder module treats the embedding as context and determines an action and a value based on the embedding and the agent's history. In other words, the decoder module treats the embedding as context and maps the agent's history to an action and a value function based on the embedding.

In more detail, a set of demonstrations d may be represented as an array of size T×n×$d_{obs}$, where T is the maximum length of the demonstrations, n is the number of demonstrations, and $d_{obs}$ is the dimension of the observations of the demonstrations. Demonstrations shorter than T may be masked or padded, and each observation may be mapped to a latent space of dimension H, such as by an input embedding module. As multi-head self-attention mechanisms (such as the transformer architecture provided herein) are equivariant to permutations of its input, 2D positional encoding can be added to the demonstrations, as shown by the summer in FIG. 3B. The result is passed through a sequence of L encoder layers (modules), each encoder layer having distinct trainable parameters but an identical architecture (i.e., being identical other than the trainable parameters). The output of each encoder layer is of size T×n×H. This output can be averaged over its demonstration dimension, to get an embedding e of size T×H. The output of each one of the L encoder layers is input to a next one of the L encoder layers. The output of the last one of the L encoder layers (the L-th one of the encoder layers) is output for the average pooling shown.

Regarding the agent's history $h_t$, each element of the agent's history $h_t$ may be mapped to a latent space of dimension H by an input embedding module, and 1D positional encoding may be added by the summer (adder) shown in FIG. 3B. The resulting array of size T'×H, where T' is the length of the history, is fed through a sequence of L decoder layers (modules). Each of the L decoder layers has an architecture including of multi-head self-attention module, multi-head cross-attention module using embedding e, and a feed-forward network module, each surrounded by a residual connection and followed by layer normalization. The output of each one of the L decoder layers is input to the next one of the L decoder layers. The output of the last one of the L decoder layers is fed to a multi-layer perceptron (MLP) module based upon which the MLP module (the MLP policy head) determines a distribution from which an action $\alpha_t$ can be sampled. Optionally, depending on the RL algorithm, the output of the last one of the L decoder layers is also fed to a second MLP module (MLP value head) based upon which the second MLP module determines an estimate of the state-value function $V_t$.

Each one of the L encoder layers may include a temporal layer, followed by a cross-demonstration layer, and then a pointwise feedforward network in the flow of information. L is an integer greater than one. Each of the L encoder layers is surrounded by a residual connection and followed by layer normalization. For input $X \in \mathbb{R}^{T \times n \times H}$, the temporal layer has output $Y \in \mathbb{R}^{T \times n \times H}$ with elements $$Y_{tik} = \text{MultiHeadSelfAttention}(X^{(0,i)})_{tk},$$

where each $X^{(0,i)} \in \mathbb{R}^{T \times H}$ is the matrix with elements $X_{tk}^{(0,i)} = X_{tik}$. The cross-demonstration layer has output $Y \in \mathbb{R}^{T \times n \times H}$, with elements $$Y_{tik} = \text{MultiHeadSelfAttention}(X^{(1,t)})_{ik},$$

where each $X^{(1,t)} \in \mathbb{R}^{T \times H}$ has elements $X_{ik}^{(1,t)} = X_{tik}$.

For inputs in $\mathbb{R}^{T \times n \times H}$, the computation and (backpropagation) memory complexities of an encoder may be both $O(T^2 n^2)$, considering H as well as the number of heads and layers to be fixed, whereas with axial attention, these complexities are reduced to $O(Tn(T+n))$. This saves computational memory during training.

An example of the training module 300 configured to perform the training discussed herein is illustrated in FIG. 3B.

In the following, the DCRL is compared to two demonstration-conditioned behavioral cloning (DCBC) methods, which may use a similar model architecture as DCRL, but are trained to minimize a BC loss. For continuous actions, the BC loss is the squared error in the mean action output of the policy MLP module, and for discrete actions, it is the cross-entropy loss in the action output of the policy MLP module.

DCBC+Multi-Task (MT) minimizes the BC loss for predicting actions in the training demonstrations. DCBC+REPTILE uses the Reptile algorithm/architecture coupled with BC loss to meta-train a model. Reptile is a meta-learning algorithm that yields similar performance to the MAML meta-training algorithm, while possibly being less computationally expensive.

For the training, 5000 demonstrations of each task are sampled. To do so, one policy per task is trained with proximal policy optimization (PPO), until each policy has at least a 99% success rate according to a task-specific success criterion. Successful trajectories from these policies are sampled. DCRL and the two DCBC examples above are trained using demonstrations sampled uniformly from this collection, and the number of such demonstrations is sampled uniformly from $\{1, \ldots, 4\}$.

The DCRL example is trained as shown in Algorithm 1, using PPO in line 12. PPO (a type of RL) is relatively simple, provides relatively short training times, and has a high quality of the resulting policies. While the example of PPO is provided, the present application is also applicable to the use of other types of RL. Training may involve 250 million environment frames or another suitable number, and the DCRL model may have approximately $5.5 \times 10^5$ learnable parameters.

The DCRL and the two DCBC approaches are evaluated on tasks not present in the training dataset (and therefore not used for training). To evaluate a policy for a single task, the policy is applied for 300 episodes, with randomly sampled demonstrations and initial conditions for each episode.

The performance is assessed by using Meta-World, a robotic manipulation benchmark (described in "Meta-World: A Benchmark and Evaluation for Multi-Task and Meta Reinforcement Learning", by Yu et al., published on arXiv at arxiv.org/abs/1910.10897, which is incorporated herein by reference), originally designed to assess the performance of meta-learning algorithms. The reward function specified in Meta-World sometimes makes it preferable for agents to stay in regions of high reward than to successfully complete a task. However, for the DCRL approach described herein, a modified reward, which acts like the time derivative of the reward, can be used.

TABLE 1

| | Return (discounted) | | Success Rate | |
|---|---|---|---|---|
| # Demonstrations | 1 | 5 | 1 | 5 |
| DCRL | 296.34 | 289.21 | 48% | 48% |
| DCBC + MT | 109.25 | 120.42 | 17% | 24% |

Table 1 above, which shows a return and success rate of DCRL and DCBC+MT averaged over all Meta-World tasks, for one or five input demonstrations, compares the discounted return and success rate of DCRL with those of DCBC+MT, on the task of few-shot imitation, with no fine-tuning. DCRL as discussed herein provides significant improvement over DCBC+MT.

DCRL can be fine-tuned effectively on new tasks using actions of a demonstrator in the demonstrations. Fine-tuning DCRL with behavior cloning may take only a minimal amount of time (e.g., a few seconds) for each task.

DCRL may achieve a 90% success rate over all Meta-World tasks, after fine-tuning on only four demonstrations. This is a large improvement over other success rates.

DCBC+REPTILE may provide a better initialization point than DCBC+MT, although this advantage may decrease with the number of demonstrations. DCRL however provides a better initialization point than both DCBC approaches. DCRL can interact with the environment during training, and thus overcome compounding errors of BC-based methods.

To assess the robustness of DCRL to a domain shift between the demonstrator and the agent, demonstrations may be collected using PPO policies for a LIMS2-AMBIDEX robot. The Sawyer robot was used in the original Meta-World benchmark. The AMBIDEX robot has seven degrees of freedom (DoF) like the Sawyer robot, but its observations are in $\mathbb{R}^{18}$ as they contain information about the gripper orientation, and it has a different mechanical structure.

Table 2 below, which shows return and success rate of DCRL averaged over 43 Meta-World tasks, using demonstrations from Sawyer (top row) or from AMBIDEX (bottom row) as input, presents the average return and success rate for DCRL with no domain shift (trained and tested with Sawyer demonstrations and Sawyer environment), and for DCRL with domain shift (trained and tested with AMBIDEX demonstrations and Sawyer environment). The results for the two settings are similar, suggesting that DCRL can cope with a domain shift.

TABLE 2

| | Return | | Success Rate | |
|---|---|---|---|---|
| # Demonstrations | 1 | 5 | 1 | 5 |
| DCRL | 315.90 | 322.69 | 51% | 51% |
| DCRL (AMBIDEX) | 308.42 | 328.70 | 45% | 48% |

To explore if DCRL can outperform a suboptimal demonstrator when presented with a new task, demonstrations are sampled by adding noise to the actions taken by task-specific expert PPO policies. Zero-mean Gaussian noise with covariance $\sigma^2 I_{4\times 4}$ is added, where the standard deviation a is an adjustable parameter. Few shot as used herein may mean 10 demonstrations or less.

Experiments have shown that for $\sigma>2$, DCRL is more successful than the task-specific demonstrator, even though it has never encountered the task before.

Figure 4:
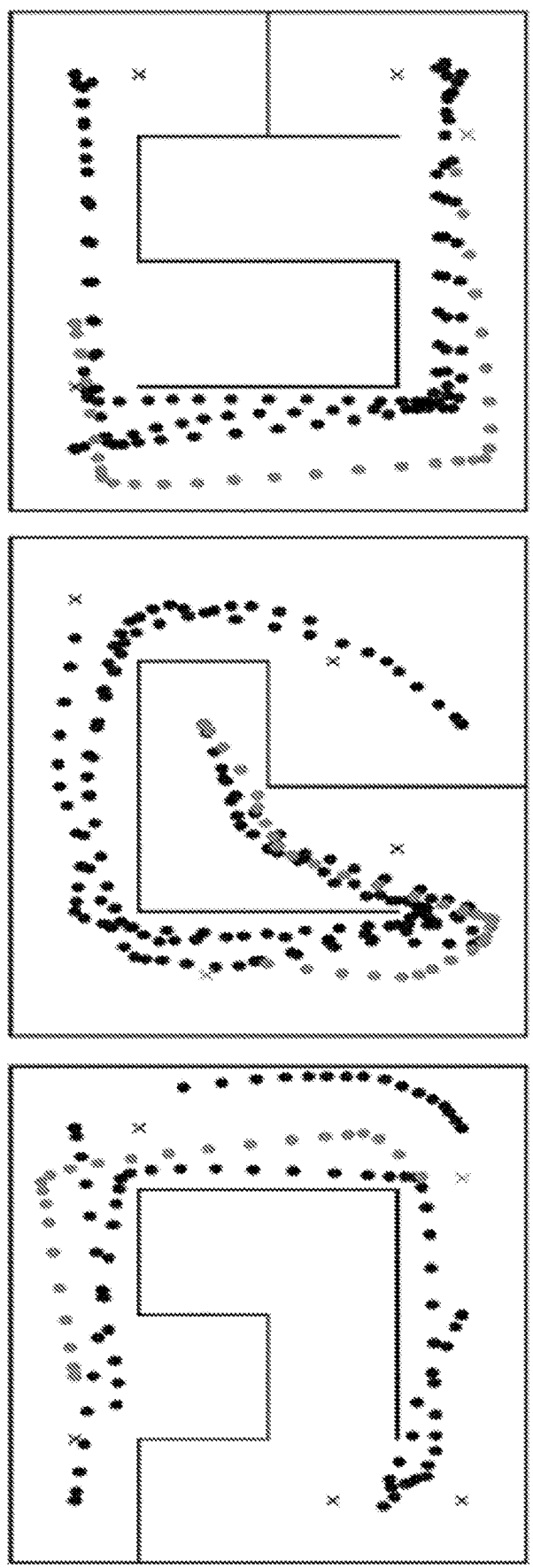
FIG. 4 illustrates three examples of navigation tasks performed by an agent.

A second test involves 60 tasks, each corresponding to a maze layout. As shown in FIG. 4, the agent must navigate between a given pair of positions (from a starting position to an ending position). This challenges agents' abilities to integrate information across demonstrations. As no information in an agent's observation specifies the current layout, the agents must use the demonstrations to learn about the layout in order to reach the ending point efficiently without hitting walls. FIG. 4 shows three examples of navigation tasks. Crosses are goals, darker dots are demonstrations, and lighter dots are a DCRL agent's history.

In each task, observations are in $\mathbb{R}^7$ (agent and goal positions, agent velocity, and orientation), there are four actions (forward, backward, turn left and turn right), the reward is minus the Euclidean distance between the agent and the goal with a bonus for reaching the goal and a penalty for hitting walls, the transition function is computed with ViZDoom (described in "ViZDoom: A Doom-based AI research platform for visual reinforcement learning", by Kempka et al, published in *IEEE Conference on Computational Intelligence and Games*, CIG, pp. 1-8, 2016, which is incorporated herein by reference), and the initial position of the agent and the goal are sampled uniformly. DCRL is trained on a fixed set of 50 mazes and tested on the remaining 10 mazes.

Table 3 below, which shows return and success rate averaged over the 10 test mazes using one or five demonstrations as input, compares the performance of DCRL with DCBC+MT, for few-shot imitation with no fine-tuning. As in the results for Meta-World (Table 1), DCRL significantly improves over DCBC+MT and DCRL's performance increases as more demonstrations are provided. One explanation for this increase may be that different demonstrations often cover different parts of the maze, so some pairs of initial and goal positions may only be addressed by integrating information from different demonstrations.

TABLE 3

| | Return | | Success Rate | |
|---|---|---|---|---|
| # Demonstrations | 1 | 5 | 1 | 5 |
| DCRL | 61.79 | 74.17 | 77% | 85% |
| DCBC + MT | 17.52 | 17.87 | 68% | 68% |

Fine-tuning provides smaller performance improvements.
To understand the benefit of cross-demonstration attention, DCRL using five demonstrations as input is compared to an algorithm in which each of these five demonstrations to DCRL are fed one at a time, and then the resulting action probabilities are averaged. Cross-demonstration attention has a consistent advantage for all 10 test mazes, in line with the expectation that attending to multiple demonstrations should help when one demonstration does not fully resolve ambiguity in the objective.

Although the above embodiments have been described in the context of method steps, they also represent a description of a corresponding component, module or feature of a corresponding apparatus or system.

Figure 5:
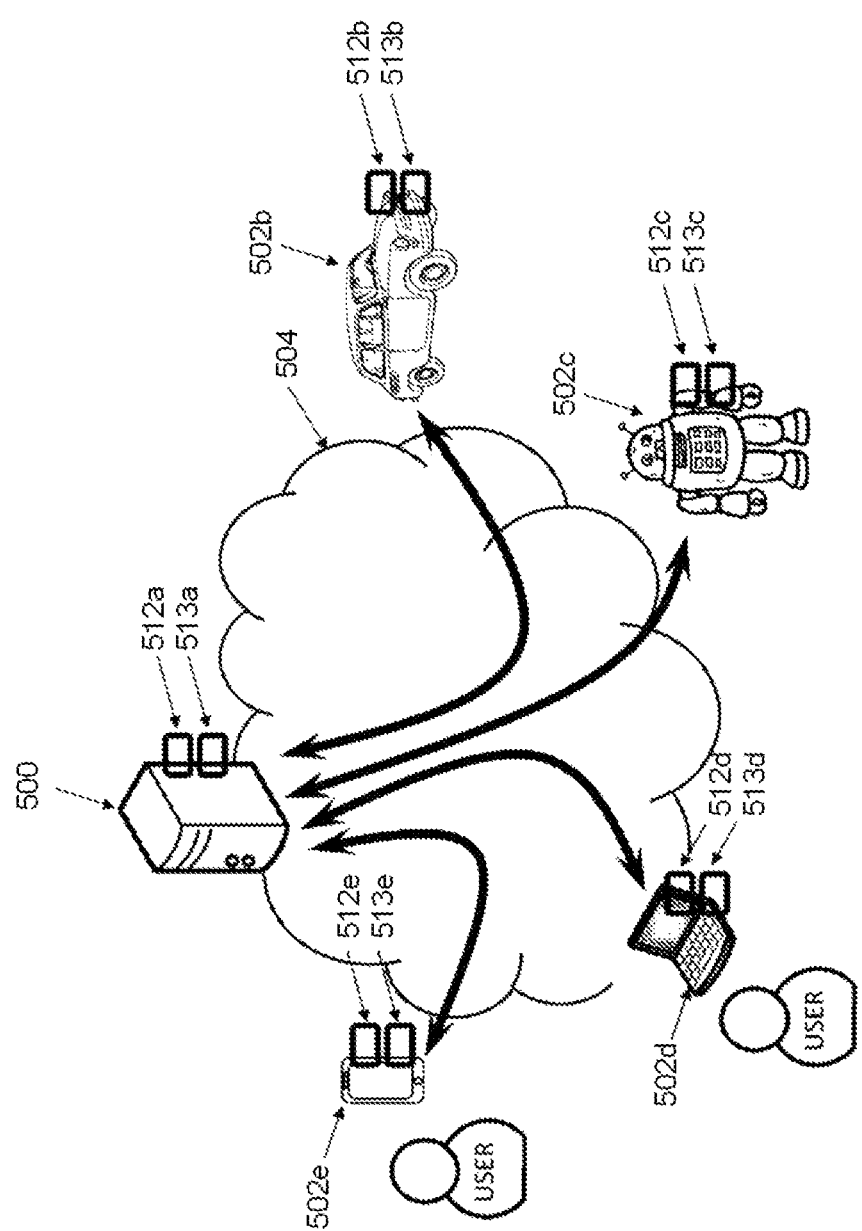
FIG. 5 illustrates a functional block diagram including an example architecture in which the disclosed systems methods may be utilized.

The methods and example embodiments described herein may be implemented within an architecture such as illustrated in FIG. 5, which includes server 500 and one or more computing devices 502 that communicate over a network 504 (which may be wireless and/or wired) such as the Internet for data exchange. Server 500 and the computing devices 502 include a processor 512 and memory 513. The computing devices 502 may be any type of computing device that communicates with the server 500, including, but not limited to, an autonomous vehicle 502b, a robot 502c, a computer 502d, or a cell phone 502e. The control module of a computing device may actuate an actuator. For example, the control module of the autonomous vehicle 502b may actuate a motor, brakes, steering, or another suitable actuator of the autonomous vehicle 502b. In the example of the robot 502c, the control module may actuate a motor, an arm, a gripper, a linear actuator, or another suitable actuator of the robot 502c.

More precisely, in an embodiment, the method according to the example of FIG. 1 and/or FIG. 2 may be performed by the server 500, the autonomous vehicle 502b, and/or the robot 502c (e.g., where instructions executed by processor 512 stored in memory 513 of computing devices 502 instantiate an agent embodying the disclosed methods using a control module, including a policy network, and a training module, including the transformer architecture for navigating the autonomous vehicle 502b, and/or the robot 502c). In other embodiments, the methods according to the embodiments of FIG. 1 and/or FIG. 2 may be performed by the client device 502 partially or completely. In yet other embodiments, the methods may be performed at a different server or on a plurality of servers in a distributed manner.

Few-shot imitation learning reduces the number of demonstrations required for an agent (e.g., a robot) to learn to perform new tasks. Demonstration-conditioned reinforcement learning (DCRL) is used herein to perform few-shot imitation. While DCRL may involve a specification of reward functions for training, the extra cost can be outweighed by a reduction in the number of demonstrations at inference time and an improved success rate on new tasks, relative to other few-shot imitation methods. Results on robotic manipulation and navigation tests show that DCRL can improve on suboptimal demonstrators and succeed even when there is a domain shift between the agent and demonstrator.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method, performed by a processor and memory, embodied in an agent comprising a trained policy network for performing at least one task, the method performed using the agent comprising:

obtaining a set of first demonstrations and an observation as input for the trained policy network;

inputting the set of first demonstrations and the observation into the trained policy network for performing a task associated with the first demonstrations; and determining, by the trained policy network, at least one action to be performed via at least one of an actuator of the agent and a motor of the agent based on the inputted set of first demonstrations and the inputted observation, wherein the trained policy network is trained using reinforcement learning.

2. The method of claim 1 further comprising determining at least one action comprising at least one of controlling a robot or a part of the robot, controlling a machine, controlling a vehicle, and manipulating a state of an environment.

3. The method of claim 1, wherein the trained policy network has the transformer architecture with axial attention.

4. The method of claim 1, wherein the trained policy network includes at least one of a first self-attention module for processing the set of first demonstrations, a second self-attention module for processing the observation, and a cross-attention module for processing the set of first demonstrations and the observation.

5. The method of claim 1 wherein a demonstration of the set of first demonstrations includes a sequence of observations, wherein each of the observations includes at least one of a state-action pair, a state, a position, an image, and a sensor measurement.

6. The method of claim 1 wherein:
the task includes a manipulation task for manipulating an object by a robot;
the observation includes information on one or more parts of the robot;
the set of first demonstrations includes a sequence including at least one of positions and orientations of the one or more parts of the robot; and
the method further includes controlling at least one actuator of the robot based on the determined action to be performed.

7. The method of claim 1 wherein:
the task includes a navigation task for navigating a robot;
the observation includes information on one or more parts of the robot;
the set of first demonstrations includes a sequence of positions of the robot; and
the method further includes controlling at least one actuator of the robot based on the determined action to be performed.

8. A computer-implemented method for performing few-shot imitation, the computer implemented method comprising:

obtaining at least one set of training data, wherein each set of training data is associated with a task and includes (i) at least one of samples of rewards and a reward function, (ii) at least one of samples of state transitions and a transition distribution, and (iii) a set of first demonstrations;

training a policy network embodied in an agent using reinforcement learning by:
inputting at least one set of first demonstrations of the at least one set of training data into the policy network; and
maximizing a risk measure or an average return over the at least one set of first demonstrations of the at least one set of training data based on respective one or more reward functions or respective samples of rewards; and after the training:
obtaining a set of second demonstrations associated with a new task not included in the training data; and
inputting the set of second demonstrations and an observation of a state into the trained policy network for performing the new task.

9. The computer-implemented method of claim 8, wherein the policy network includes one of:
the transformer architecture with axial attention; and
at least one of a first self-attention module configured to process the set of second demonstrations, a second self-attention module configured to process the observation of the state, and a cross-attention module configured to process the set of second demonstrations and the observation of the state.

10. The computer-implemented method of claim 8 wherein the policy network includes the transformer architecture with axial attention and the computer-implemented method further comprises at least one of:
encoding the inputted at least one set of first demonstrations as a first multidimensional tensor and applying attention by a first transformer of the policy network is along a single axis of the first multidimensional tensor; and
encoding the inputted set of second demonstrations as a second multidimensional tensor and applying attention of a second transformer of the policy network along a single axis of the second multidimensional tensor.

11. The computer-implemented method of claim 8, wherein at least one of:
the obtaining a set of second demonstrations associated with a new task and the inputting the set of second demonstrations and an observation of a state into the trained policy network for performing the new task are performed at inference time; and
the obtaining at least one set of training data and training a policy network using reinforcement learning are performed during training time.

12. The computer-implemented method claim 8, wherein the inputting the at least one set of first demonstrations of the at least one set of training data into the policy network to train the policy network includes inputting at least one of a state of the agent, a state-action pair, and an observation-action history into the policy network for training the policy network.

13. The computer-implemented method of claim 8, wherein the at least one set of first demonstrations of the at least one set of training data include demonstrations of at least two tasks, and wherein maximizing the average return over the at least one set of first demonstrations of the at least one set of training data includes maximizing an average cumulative reward over the at least two tasks.

14. A system comprising:
a control module including a policy network that:
is trained based on a set of training tasks; and
includes the transformer architecture with axial attention on a single axis of a multi-dimensional tensor generated by the transformer architecture; and a training module configured to:
input to the policy network a set of demonstrations for a task that is different than the training tasks; and
train weight parameters of encoder modules of the transformer architecture based on the single axis of the multi-dimensional tensor generated based on the input set of demonstrations.

15. The system of claim 14 wherein the training module is configured to train the weight parameters of the encoder modules based on maximizing an average return of the policy network.

16. The system of claim 14 wherein the control module is configured to selectively actuate an actuator based on an output of the policy network.

17. The system of claim 14 wherein the transformer architecture includes an encoding module configured to generate the multi-dimensional tensor based on the set of demonstrations.

18. The system of claim 14 wherein each demonstration of the set of demonstrations includes a time series of observations.

19. The system of claim 18 wherein the time series of observations are of random lengths.

20. The system of claim 18 wherein each observation includes at least one of:
a state-action pair;
a state;
a position;
an image; and
a measurement.

21. The system of claim 14 wherein the task is manipulating an object, and wherein the set of demonstrations includes a sequence of positions and orientations of a robot.

22. The system of claim 14 wherein the task includes navigating toward a target position, and wherein the set of demonstrations includes a sequence of positions of a navigating robot.

23. The system of claim 14 wherein the policy network includes L encoder layers connected in series, wherein L is an integer greater than one.

24. The system of claim 23 wherein the policy network further includes L decoder layers configured to determine an action based on an output of the L encoder layers.

25. The system of claim 14 further comprising a processor executing instructions stored in a memory, wherein the instructions stored in the memory further comprise instructions for the control module, including the policy network, and the training module.

26. The system of claim 25 wherein the instructions further comprise instructions for training the policy network with the training tasks using reinforcement learning.

27. The system of claim 26 wherein the instructions further comprise instructions for an agent, including the policy network, that is configured to determine at least one action to be performed based the set of demonstrations for the task that is different than the training tasks.

28. The system of claim 27 wherein the at least one action is a navigation action.

29. The system of claim 28 wherein the agent determines the navigation action for a robot.

30. The system of claim 26 wherein the instructions using reinforcement learning use proximal policy optimization.

* * * * *